United States Patent [19]

Greaser

[11] 4,446,786
[45] May 8, 1984

[54] CAM GUIDE OPERATING MECHANISM FOR ROLL BALING MACHINE

[75] Inventor: Randy A. Greaser, Narvon, Pa.

[73] Assignee: Sperry Corporation, New Holland, Pa.

[21] Appl. No.: 472,458

[22] Filed: Mar. 7, 1983

[51] Int. Cl.³ .......................... B30B 5/06; A01D 39/00
[52] U.S. Cl. .......................................... 100/88; 56/341
[58] Field of Search .................... 100/88, 89; 56/341, 56/342, 343

[56] References Cited

U.S. PATENT DOCUMENTS 3,815,345  6/1974  Mast et al. .......................... 56/341
3,847,073  11/1974  Mast et al. .......................... 100/88

Primary Examiner—Peter Feldman
Attorney, Agent, or Firm—D. F. Marquette; F. A. Seemar; L. W. Miller

[57] ABSTRACT

In a roll baling machine having a bale forming apron defining an expandable bale chamber, guide members extending into the bale chamber to support the apron and thereby define an initial shape for the bale chamber, the guide members being movable out of the bale chamber during bale formation without being opposed by springs which exert force to urge the guide members back into the bale chamber only after a bale that is being discharged from the machine has cleared the guide members.

10 Claims, 2 Drawing Figures

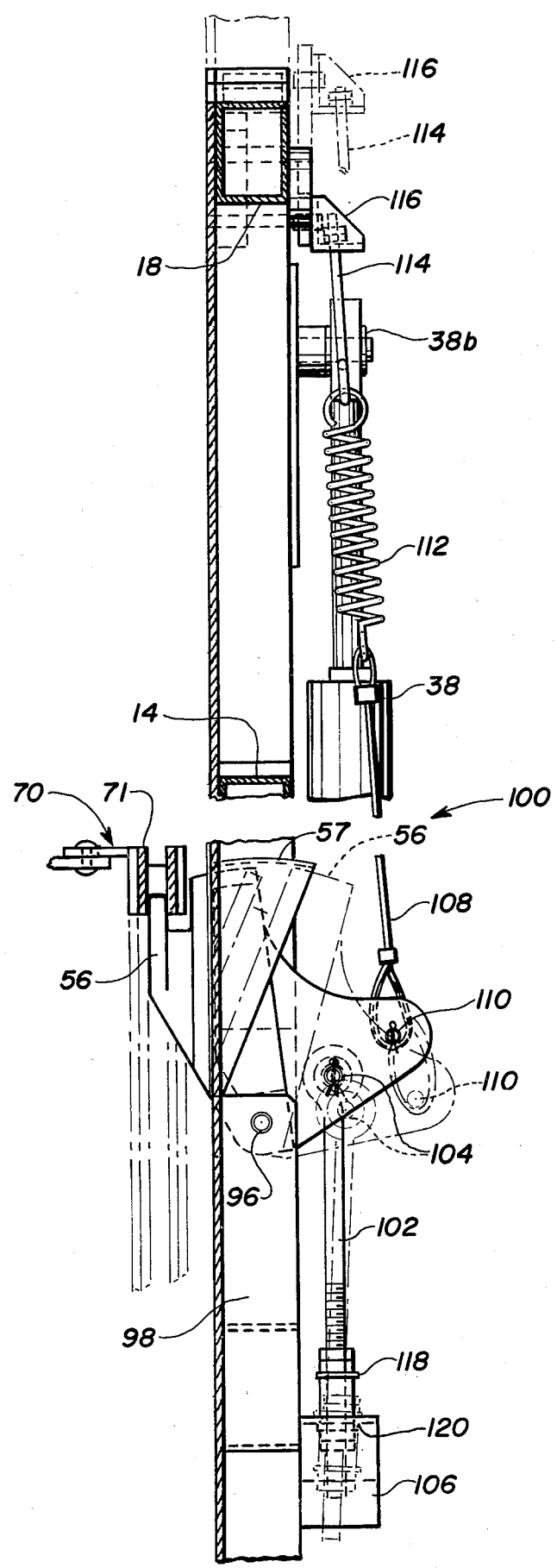

CAM GUIDE OPERATING MECHANISM FOR ROLL BALING MACHINE

BACKGROUND AND SUMMARY OF THE INVENTION

Roll baling machines such as disclosed in U.S. Pat. No. 3,815,345 have used guide members to support a bale forming apron in order to define an initial shape for an expandable bale chamber. These guide members are movable between an extended position inside the bale chamber where they support the apron and a retracted position outside the bale chamber. The guide members are constantly urged toward their extended positions by springs. This constant urging of the guide members results in bale damage such as scuffing and hollowing out of bale ends during formation. Furthermore, this constant urging of the guide members interferes with the discharging of bales from the machine.

The present invention overcomes these problems by providing that the guide members are movable from their extended positions to their retracted positions during bale formation without being opposed by the springs which remain relaxed and by providing that the springs exert force to urge the guide members toward their extended positions only after a bale that is formed in the bale chamber has cleared the guide members during the discharge of the bale from the machine. In other words, the springs do not constantly urge the guide members toward their extended positions, but they do apply force to return the guide members to their extended positions at a predetermined point during bale discharging. The guide members are maintained in their extended positions by the bale forming apron which rests thereon to define the initial shape for the expandable bale chamber.

BRIEF DESCRIPTION OF THE DRAWINGS

FIG. 2 is an enlarged sectional view taken along lines 2—2 in FIG. 1.

DESCRIPTION OF THE PREFERRED EMBODIMENT

Figure 1:
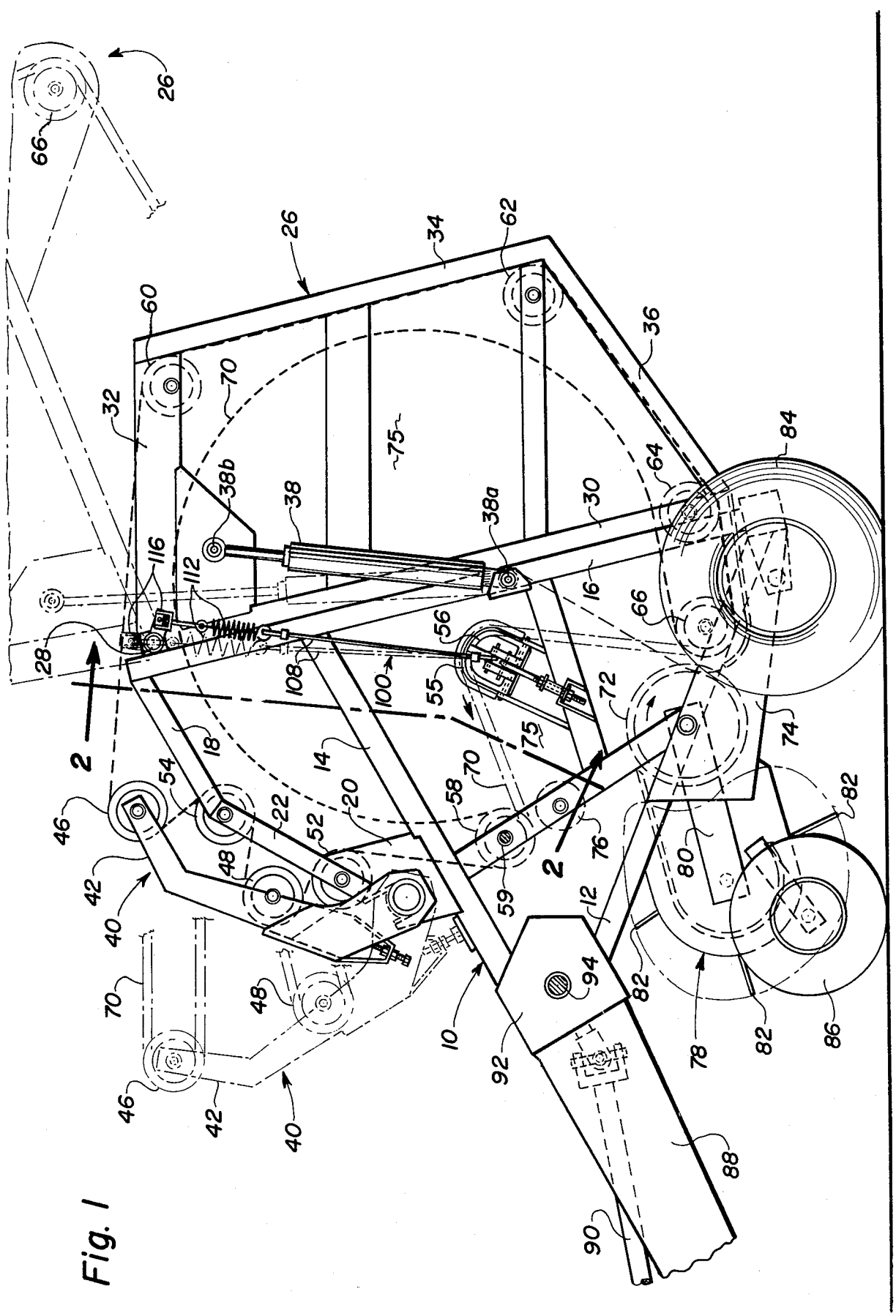
FIG. 1 is a side-elevation view of a roll baling machine embodying the present invention.

Referring to FIG. 1, a typical baling machine embodying the preferred embodiment of the present invention includes a base frame 10 having opposite sides each formed generally of frame members 12,14,16 rigidly connected in a triangular configuration with side plates substantially covering the space therebetween. Each side of the base frame 10 includes an upper section, which consists of a frame member 18 rigidly connected to the frame member 16, a bracket 20 rigidly connected to frame member 14, and a frame member 22 rigidly connected between the frame member 18 and the bracket 20. A plate is connected to and covers the space between the frame members 14,16,18 and 22. A rear frame 26 is pivotally connected at 28 to the base frame 10 by suitable bearings. The rear frame 26 has opposite sides each formed generally of frame members 30,32,34,36 rigidly connected in a substantially trapezoidal configuration with side plates substantially covering the space therebetween. Other frame members (not shown) extend transversely of the machine and connect the opposite sides of the base frame 10 and the opposite sides of the rear frame 26.

The rear frame 26 is pivotally movable from the lower position shown in full lines in FIG. 1 to an upper portion shown in phantom by hydraulic cylinders 38 mounted at the sides of the macine. The hydraulic cylinders 38 are connected at their lower ends 38a to the base frame 10 and at their upper ends 38b to the rear frame 26.

An arm assembly 40 is rotatably mounted on the base frame 10 for rotational movement between a forward position shown in phantom lines in FIG. 1 and a rearward position shown in full lines in FIG. 1. The arm assembly 40 includes arms 42 disposed inboard the sides of the machine. The arms 42 are rigidly connected to a cross tube that is rotatably mounted in suitable bearing members carried by the brackets 20 on the opposite sides of the base frame 10. The arm assembly 40 is normally urged toward its forward position preferably by conventional means such as extension or compression springs (not shown) connected between the arm assembly 40 and the base frame 10.

The arm assembly 40 carries rotatable guide members 46 and 48 on its arms 40. The base frame 10 supports rotatable guide members 52,54 and cam guide members 56 inboard its opposite sides. The cam guide members 56 extend through openings 55 formed in the opposite sides of the base frame 10. Sprockets 58 are provided inboard the opposite sides of the base frame 10 and are fixed on a shaft 59 that is rotatably mounted in suitable bearings on the base frame 10. The rear frame 26 supports rotatable guide members 60,62,64,66 inboard its opposite sides.

A flexible bale forming apron 70 is movably supported on the aforementioned guide members and sprockets. The apron 70 is preferably formed of a pair of endless link-type chains connected at spaced intervals by transverse bars or slats. The apron chains extend around and engage the various guide members and the sprockets 58. This apron 70 may be of the known type disclosed in U.S. Pat. No. 3,901,007 and designated therein by the numeral "82".

A floor roller 72 extends transversely of the machine and is rotatably supported by brackets 74 on the opposite sides of the base frame 10. Preferably, the floor roller 72 consists of a hollow metal drum with a relatively smooth coating or layer of rubber applied to its outer surface. When the machine is empty, the upper surface of the floor roller 72 cooperates with a course of the apron 70 that extends upwardly and rearwardly from the guide members 66 over the cam guide members 56 and then downwardly and forwardly to the sprockets 58 to define an expandable bale chamber 75 having an initial wedge shape in side elevation. In this initial wedge shape, the forward end of the bale chamber 75 is narrower than the rearward end thereof. A stripper roller 76, preferably rubber coated, extends transversely of the machine and is rotatably supported on the opposite sides of the base frame 10. The stripper roller 76 is positioned at the forward end of the bale chamber 75 in close proximity to the apron 70.

A pickup header 78 extends transversely of the machine and is supported by brackets 80 on the opposite sides of the base frame 10. The pickup header 78 is preferably of conventional type having a series of projecting fingers 82 for engaging and picking up windrowed crop material. A pair of wheels 84 mounted on the opposite sides of the base frame 10 support the machine. Another pair of wheels 86 support the pickup header 78. A tongue 88 is provided on the forward end of the base frame 10 for connection to a tractor.

An input shaft 90 is supported on the tongue 88 and is connectable at one end to the power take off unit (PTO) of a tractor (not shown). The other end of the input shaft 90 is connected through a gear box 92 to a transverse output shaft 94. Conventional means such as sheaves and a belt (not shown) may be used to deliver power from the output shaft 94 to the shaft 59 in order to drive the sprockets 58 and thereby propel the apron 70 in the direction indicated. Other conventional means such as sprockets and chains (not shown) may be used to deliver power from the shaft 59 to drive the floor roller 72, the stripper roller 76, and the pickup header 78 in the directions indicated.

As the machine is pulled across a field by a tractor, the pickup header fingers 82 engage, pickup and deliver windrowed crop material onto the upper surface of the rotating floor roller 72 in the bale chamber 75. The crop material is carried upwardly and then coiled back downwardly onto itself by the apron 70 which in its starting position moves upwardly and rearwardly from the guide members 66 over the cam guide members 56 and then downwardly and forwardly to the sprockets 58. This movement of the apron 70 in the bale chamber 75 effectively starts the core of the roll bale. The rotating stripper roller 76 removes crop material from the apron 70 at the forward end of the bale chamber 75 and delivers it back downwardly into the bale chamber 75. The roll bale increases in diameter lifting the inner source of the apron 70 that extends between the guide members 66 and the sprockets 58 off the cam guide members 56, and expanding the bale chamber 75 from its initial wedge shape to a substantially circular shape. The expansion of the bale chamber 75 results in expansion of the inner course of the apron 70 contacting the peripheral surface of the roll bale. This expansion of the inner course of the apron 70 is accomplished by rotation of the arm assembly 40 in a clockwise direction as viewed in FIG. 1, from its forward position. When it is desired to discharge a bale from the machine, the rear frame 26 is raised to its upper position. This stretches the inner course of the apron 70 across the space between the guide members 66 and the sprockets 58 thereby assisting the bale to exit the machine.

Referring now particularly to FIG. 2, it will be seen that the cam guide members 56 are pivotally mounted on shafts 96 supported in brackets 98. Shield members 57 are provided around the openings 55 through which the cam guide members 56 extend. Mechanisms 100 are provided for operating the cam guide members 56. Each mechanism 100 includes a rod 102 connected at its upper end to a cam guide member 56 by a pin 104. The rods 102 are slidable through openings in brackets 106. The mecanism 100 each include a cable 108 connected at its lower end to a cam guide member 56 by a pin 110. The upper ends of the cables 108 are connected to springs 112 which are fastened by link members 114 to brackets 116 mounted on the rear frame 26.

When the machine of FIG. 1 is empty and is ready to form a bale, the apron chains 71 will be resting on the upper cam surfaces of the cam guide members 56 thereby maintaining the cam guide members 56 in an extended position shown in full lines in FIG. 2. In this extended position, there is no force exerted on the cam guide members 56 by the springs 112 since the springs 112 are completely relaxed. During formation of a bale in the bale chamber 75, the apron chains 71 are lifted off the cam guide members 56. The bale then pushes against the cam guide members 56 causing them to pivot (in a clockwise direction as seen in FIG. 2) on the shafts 96 to a retracted position outside the bale chamber 75. This pivoting movement of the cam guide members 56 is not opposed by the springs 112 because the cam guide members 56 are not pivoted far enough to tension the springs 112. The springs 112 remain relaxed as the cam guide members 56 are moved from their extended positions to their retracted positions. Washers 118 on the rods 102 engage the brackets 106 to limit the downward movement of the rods 102 and thereby limit the pivoting movement of the cam guide members 56. Thus, the cam guide members 56 are moved out of the bale chamber 75 without being opposed by the springs 112 thereby preventing the cam guide members 56 from damaging the ends of the bale during formation.

When a bale has been formed in the machine and it is desired to discharge the bale, the hydraulic cylinders 38 are actuated to raise the rear frame 26. As the rear frame 26 is raised, the springs 112 are tensioned and the cables 108 are tightened. The springs 112 exert force through the cables 108 to the cam guide members 56 to move them back into the extended position shown in FIG. 2 udner the apron chains 71 as the bale exits the machine. Further washers 120 on the rods 102 engage the brackets 106 to limit the upward movement of the rods 102 and thereby limit the movement of the cam guide members 56 into the bale chamber 75. After the bale has been discharged, the hydraulic cylinders 38 are actuated to lower the rear frame 26. As the rear frame 26 is lowered, the apron chains 71 are lowered down onto the upper cam surfaces of the cam guide members 56. The springs 112 are relaxed and the cables 108 are slackened so that no force will be exerted on the cam guide members 56 until the rear frame 26 is raised again. The mechanisms 100 are preferably adjusted so that the springs 112 do not act to urge the cam guide members 56 into their extended position in the bale chamber 75 until the exiting bale is clear of the cam guide members 56. This prevents the cam guide members 56 from interferring with the discharging of the bale.

It will be understood that the washers 118 and 120 are adjustable on the rods 102 to vary the relative locations for the extended and retracted positions of the guide members 56. Furthermore, the link members 114 are adjustable with respect to the brackets 116 to vary the amount of tensioning of the springs 112 and thus vary the amount of force exerted by the springs 112 on the guide members 56.

The following claims are intended to cover all modifications and variations of the preferred embodiment of the present invention without departing from the spirit and scope of the invention.

Having thus described the invention, what is claimed is:

1. In a roll baling machine including a base frame, a bale forming apron supported on said base frame defining an expandable bale chamber, guide means on said base frame movable between an extended position inside said bale chamber for supporting said bale forming apron in order to define an initial shape for said bale chamber and a retracted position outside said bale chamber, spring means for urging said guide means toward said extended position, the improvement comprising:

said guide means being movable from said extended position to said retracted position during bale formation without being opposed by said springs means; and said springs means exerting force to urge said guide means toward said extended position only after a bale that is formed in said bale chamber has cleared said guide means during the discharge of the bale from the machine.

2. The improvement of claim 1, wherein said spring means is relaxed when said guide means is in said extended position.

3. The improvement of claim 2, wherein said spring means remains relaxed as said guide means moves from said extended position to said retracted position during bale formation.

4. The improvement of claim 3, wherein said bale forming apron contacts said guide means to maintain said guide means in said extended position.

5. The improvement of claim 4, wherein said guide means is moved from said extended position to said retracted position by a bale that is being formed in said bale chamber.

6. A roll baling machine comprising:
(a) a base frame;
(b) a bale forming apron supported on said base frame defining an expandable bale chamber;
(c) guide means on said base frame movable between an extended position inside said bale chamber for supporting said bale forming apron in order to define an initial shape for said bale chamber and a retracted position outside said bale chamber;
(d) spring means for urging said guide means toward said extended position;
(e) said guide means being moved from said extended position to said retracted position during bale formation without being opposed by said spring means; and
(f) said spring means exerting force to urge said guide means toward said extended position only after a bale that is formed is said bale chamber has cleared said guide means during the discharge of the bale from the machine.

7. The roll baling machine of claim 6, further comprising:
(a) a rear frame pivotally connected to said base frame for movement between a lower position whereby a bale may be formed in said bale chamber and an upper position whereby a bale may be discharged from said bale chamber; and
(b) said guide means being urged by said spring means toward said extended position in response to said rear frame being moved from said lower position toward said upper position.

8. The roll baling machine of claim 7, wherein said spring means is connected between said rear frame and said guide means.

9. The roll baling machine of claim 8, wherein said spring means is tensioned when said rear frame is moved from said lower position toward said upper position to thereby exert force on said guide means.

10. The roll baling machine of claim 9, further comprising a cable connecting said spring means to said guide means.

* * * * *